(12) United States Patent
Mazzitelli et al.

(10) Patent No.: US 10,412,949 B2
(45) Date of Patent: Sep. 17, 2019

(54) GUNWALE MOUNTED FISHING STANCHION

(71) Applicant: Predator Offshore Products, LLC, Dover, NH (US)

(72) Inventors: Andrew Mazzitelli, Sanford, ME (US); Leo Croisetiere, Dover, NH (US)

(73) Assignee: PREDATOR OFFSHORE PRODUCTS, LLC, Dover, NH (US)

( * ) Notice: Subject to any disclaimer, the term of this patent is extended or adjusted under 35 U.S.C. 154(b) by 274 days.

(21) Appl. No.: 15/623,854

(22) Filed: Jun. 15, 2017

(65) Prior Publication Data
US 2018/0255758 A1 Sep. 13, 2018

Related U.S. Application Data

(60) Provisional application No. 62/469,141, filed on Mar. 9, 2017.

(51) Int. Cl.
*A01K 97/10* (2006.01)

(52) U.S. Cl.
CPC .................... *A01K 97/10* (2013.01)

(58) Field of Classification Search
CPC ..................................... A01K 97/10
USPC ......................................... 43/21.2
See application file for complete search history.

(56) References Cited

U.S. PATENT DOCUMENTS

| | | | | | |
|---|---|---|---|---|---|
| 2,499,821 | A | * | 3/1950 | Geisheimer | A01K 97/10 248/514 |
| 3,006,588 | A | * | 10/1961 | Lemi | A01K 97/10 248/126 |
| 3,422,561 | A | * | 1/1969 | McLean | A01K 97/10 43/19.2 |
| 3,628,759 | A | * | 12/1971 | Knedlik | A01K 97/10 248/291.1 |
| 3,858,833 | A | * | 1/1975 | Fink | A01K 97/10 248/530 |
| 4,425,729 | A | * | 1/1984 | Miyamae | A01K 97/10 248/538 |
| 4,497,129 | A | * | 2/1985 | Chestnut | A01K 97/10 248/156 |
| 4,645,167 | A | * | 2/1987 | Hardwick | B63B 29/04 248/283.1 |
| 4,753,029 | A | * | 6/1988 | Shaw | A01K 97/10 248/538 |

(Continued)

FOREIGN PATENT DOCUMENTS

| | | | | |
|---|---|---|---|---|
| CA | 2521577 | A1 * | 1/2007 | ............. A01K 97/10 |
| EP | 3108749 | A1 * | 12/2016 | ............... A45F 3/02 |

*Primary Examiner* — Christopher P Ellis
(74) *Attorney, Agent, or Firm* — Duane Morris LLP; Gregory M. Lefkowitz; Jason M. Nolan

(57) ABSTRACT

A fishing rod stanchion is described. The fishing rod stanchion can be configured to receive and hold a fishing rod in an upright position, and the fishing rod stanchion can include a support plate having a proximal portion, a distal portion, and one or more openings passing through the support plate, an upright stanchion having a top end and a bottom end, such that the top end is coupled to the proximal portion of the support plate, and a handle extending laterally beyond an end of a proximal edge of the support plate. A system including a fishing rod stanchion is also described. The system can include the fishing rod stanchion, a fishing rod holder, and a fishing rod.

20 Claims, 13 Drawing Sheets

(56) References Cited

U.S. PATENT DOCUMENTS

| | | | | |
|---|---|---|---|---|
| 4,920,681 A * | 5/1990 | Toliver, Jr. | A01K 97/11 | 248/514 |
| 5,014,458 A * | 5/1991 | Wagner | A01K 97/10 | 43/21.2 |
| 5,125,615 A * | 6/1992 | McGuire | A01K 97/10 | 248/289.11 |
| 5,137,319 A * | 8/1992 | Sauder | A01K 97/10 | 206/315.11 |
| 5,163,244 A * | 11/1992 | Rupp | A01K 97/11 | 248/514 |
| 5,187,892 A * | 2/1993 | Gutierrez | A01K 97/10 | 248/156 |
| 5,279,064 A * | 1/1994 | Jaeger | A01K 97/11 | 43/15 |
| 5,365,689 A * | 11/1994 | Holliman | A01K 97/10 | 248/515 |
| 5,501,027 A * | 3/1996 | Acker | A01K 97/125 | 43/17 |
| 5,632,112 A * | 5/1997 | Steinborn | A01K 97/10 | 248/540 |
| 5,987,803 A * | 11/1999 | White | A01K 97/10 | 43/21.2 |
| 6,338,465 B1 * | 1/2002 | Stoner | A01K 97/10 | 248/156 |
| 6,530,170 B1 * | 3/2003 | Sweeney | A01K 97/10 | 211/70.8 |
| 6,568,648 B1 * | 5/2003 | Ray | A01K 97/10 | 248/538 |
| 7,520,485 B1 * | 4/2009 | Giannetto | A01K 97/10 | 173/91 |
| 9,155,292 B1 * | 10/2015 | Tweedie | A01K 97/10 | |
| 2003/0042075 A1 * | 3/2003 | Bench | A01K 97/10 | 182/115 |
| 2003/0230684 A1 * | 12/2003 | Clary | A01K 97/06 | 248/219.2 |
| 2006/0048441 A1 * | 3/2006 | Sharff | A01K 97/06 | 43/54.1 |
| 2008/0115401 A1 * | 5/2008 | Roemer | A01K 97/08 | 43/21.2 |
| 2011/0185621 A1 * | 8/2011 | Lamb | A01K 97/10 | 43/21.2 |
| 2014/0332655 A1 * | 11/2014 | Colbert | A01K 97/10 | 248/512 |
| 2015/0208634 A1 * | 7/2015 | Box | A01K 97/10 | 108/25 |
| 2017/0196212 A1 * | 7/2017 | Tuck | A01K 97/10 | |
| 2018/0020651 A1 * | 1/2018 | Larkin | A01K 97/10 | 43/21.2 |
| 2018/0146655 A1 * | 5/2018 | Crossen | A01K 97/10 | |

* cited by examiner

US 10,412,949 B2

GUNWALE MOUNTED FISHING STANCHION

CROSS-REFERENCE TO RELATED APPLICATIONS

The present application claims benefit of U.S. Provisional Patent Application No. 62/469,141, filed Mar. 9, 2017, the entirety of which is incorporated herein by reference.

FIELD OF THE INVENTION

The present invention relates generally to a fishing rod stanchion and system comprising the same.

BACKGROUND

Angling is a method of fishing with a hook, which is usually attached to a fishing line and a fishing rod. On a fishing vessel, the fishing rods are typically secured in fishing rod holders that are mounted on the top face of a gunwale or the stern of the vessel. After a fish is hooked, the fishing rod can be transferred from the fishing rod holder to the angler's "fighting belt" or "fighting chair," both of which include features to provide comfort and leverage for fighting and reeling in the fish.

SUMMARY

In various embodiments, a fishing rod stanchion is disclosed. The fishing rod stanchion is configured to be mounted on a gunwale or stern of a vessel and to receive and secure a fishing rod while trolling or reeling in a fish. The fishing rod stanchion can comprise a support plate comprising a proximal portion, a distal portion, and one or more openings passing through the support plate, an upright stanchion comprising a bottom end and a top end that is coupled to the support plate, and a handle extending laterally beyond an end of a proximal edge of the support plate. The fishing rod stanchion optionally includes one or more reinforcing members extending from the support plate to the upright stanchion.

In various embodiments, a system is disclosed. The system comprises a fishing rod stanchion, one or more fishing rod holders, and one or more fishing rods. The fishing rod stanchion is configured to be mounted on a gunwale or stern of a vessel and to receive and secure a fishing rod while trolling or reeling in a fish. The fishing rod stanchion can comprise a support plate comprising a proximal portion, a distal portion, and one or more openings passing through the support plate, an upright stanchion comprising a bottom end and a top end that is coupled to the support plate, and a handle extending laterally beyond an end of a proximal edge of the support plate. The fishing rod stanchion optionally includes one or more reinforcing members extending from the support plate to the upright stanchion. The one or more fishing rod holders and one or more fishing rods are any standard sized or suitably sized fishing rod holders and fishing rods.

BRIEF DESCRIPTION OF THE DRAWINGS

The features and advantages of the present invention will be more fully disclosed in, or rendered obvious by the following detailed description of the preferred embodiments, which are to be considered together with the accompanying drawings wherein like numbers refer to like parts and further wherein.

DETAILED DESCRIPTION

Figure 1:
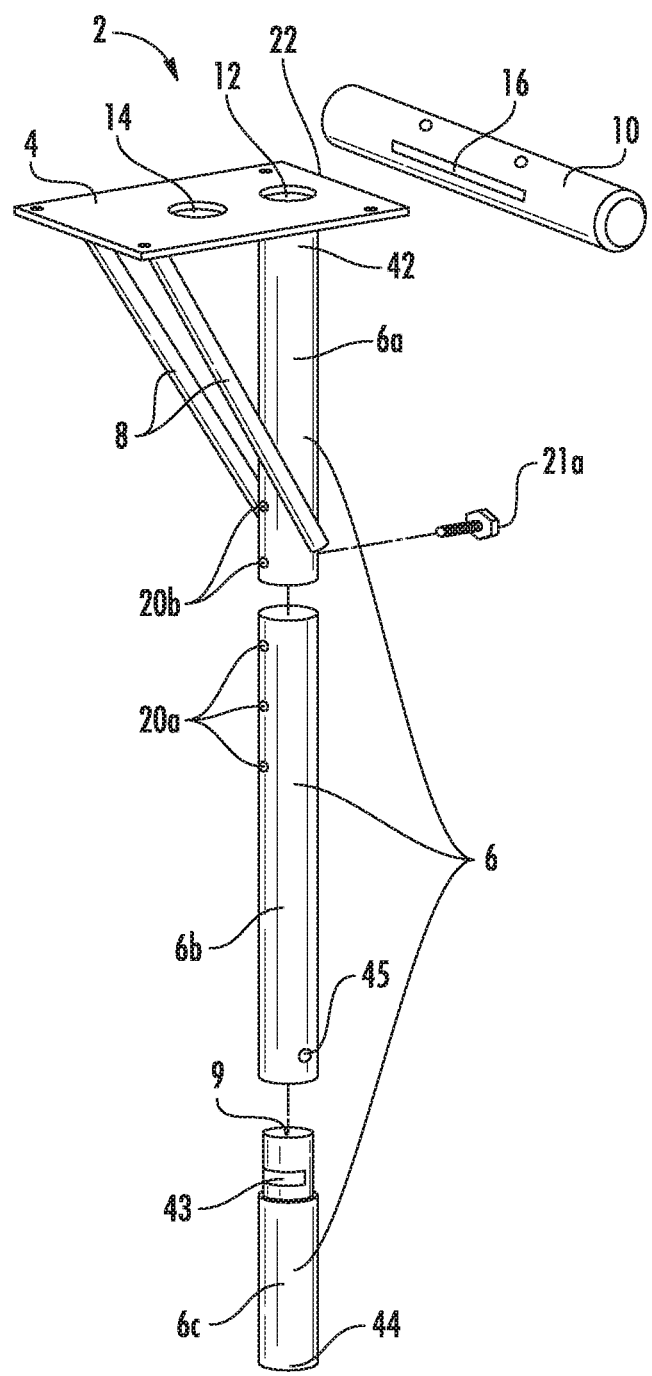
FIG. 1 is an exploded perspective view of a fishing rod stanchion, in accordance with some embodiments described herein.

This description of the exemplary embodiments is intended to be read in connection with the accompanying drawings, which are to be considered part of the entire written description. In the description, relative terms such as "lower," "upper," "horizontal," "vertical," "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description and do not require that the apparatus be constructed or operated in a particular orientation. Terms concerning attachments, coupling and the like, such as "connected," refer to a relationship wherein structures are secured or attached to one another either directly or indirectly through intervening structures, as well as both movable or rigid attachments or relationships, unless expressly described otherwise.

In various embodiments, a fishing rod stanchion that can be mounted to the gunwale or stern of a vessel and used to receive, secure, and control a fishing rod is disclosed. In some embodiments, the fishing rod stanchion comprises a support plate comprising a proximal portion, a distal portion, and one or more openings passing through the support plate, an upright stanchion comprising a bottom end and a top end that is coupled to the support plate, and a handle extending laterally beyond an end of a proximal edge of the support plate. The fishing rod stanchion optionally includes one or more reinforcing members extending from the support plate to the upright stanchion. A system comprising a fishing rod stanchion is also disclosed.

FIGS. 1-13 illustrate embodiments of the fishing rod stanchion 2, including a support plate 4, an upright stanchion 6, a reinforcing member 8, and a handle 10. In some embodiments, the support plate 4 has a length 32 and a width 30. In some embodiments, the support plate 4 includes a proximal third 28, a middle third 26, and a distal third 24. In some embodiments, the support plate 4 includes a distal end 22, which includes the edge of the distal third 24 of the support plate 4.

In some embodiments, the support plate 4 can be any suitable length 32, such as, for example, a length in the range from about 3 to about 24 inches, including, for example, at least 6 inches, at least 9 inches, or at least 12 inches, or any other suitable length. In some embodiments, the support plate 4 can be any suitable width 30, such as, for example, a width in the range from about 2 inches to about 24 inches, or a width of at least 3 inches, at least 5 inches, at least 10 inches, or at least 16 inches, or any other suitable width. Although specific lengths and widths are discussed herein, it will be appreciated that the support plate 4 can be any suitable lengths and widths that are larger or smaller than the measurements disclosed herein.

In some embodiments, the support plate 4 has a rectangular shape. Although the support plate 4 in FIGS. 1, 3, 6, and 9-13 is rectangular, other shapes are also contemplated. For example, support plate 4 can be in the shape of a square, trapezoid, triangle, oval, D-shape, closed U-shape, hexagon, octagon, etc. It will be appreciated that the support plate 4 can be any suitable shape.

In some embodiments, the support plate 4 can include one or more openings passing through the support plate. For example, in some embodiments, the support plate 4 can include a rod opening 14, a stanchion opening 12, or both 12 and 14. In some embodiments, the one or more openings are circular. In some embodiments, for example, the rod opening 14 will be circular and defined by its diameter 34. In some embodiments, for example, the stanchion opening 12 will be circular and defined by its diameter 36. In some embodiments, the rod opening 14 can be any suitable diameter 34 and the stanchion opening 12 can be any suitable diameter 36, such as, for example, a diameter in the range from about ¼ inch to about 4 inches, or from ½ inch to 3½ inches, or from 1 inch to 3 inches, or any combination thereof (e.g., ¼ inch to 3 inches). Although specific diameters are discussed herein, it will be appreciated that the rod opening 12 and the stanchion opening 14 can be any suitable diameters that are larger or smaller than the measurements disclosed herein. Although the openings 12 and 14 in FIGS. 1, 3, and 9-13 are circular, other shapes are contemplated. For example, the openings can be in the shape of a rectangle (including square), triangle, trapezoid, or any other suitable shape. It will be appreciated that, independent of shape, the openings 12 and 14 can have any suitable lengths and widths.

Figure 6:
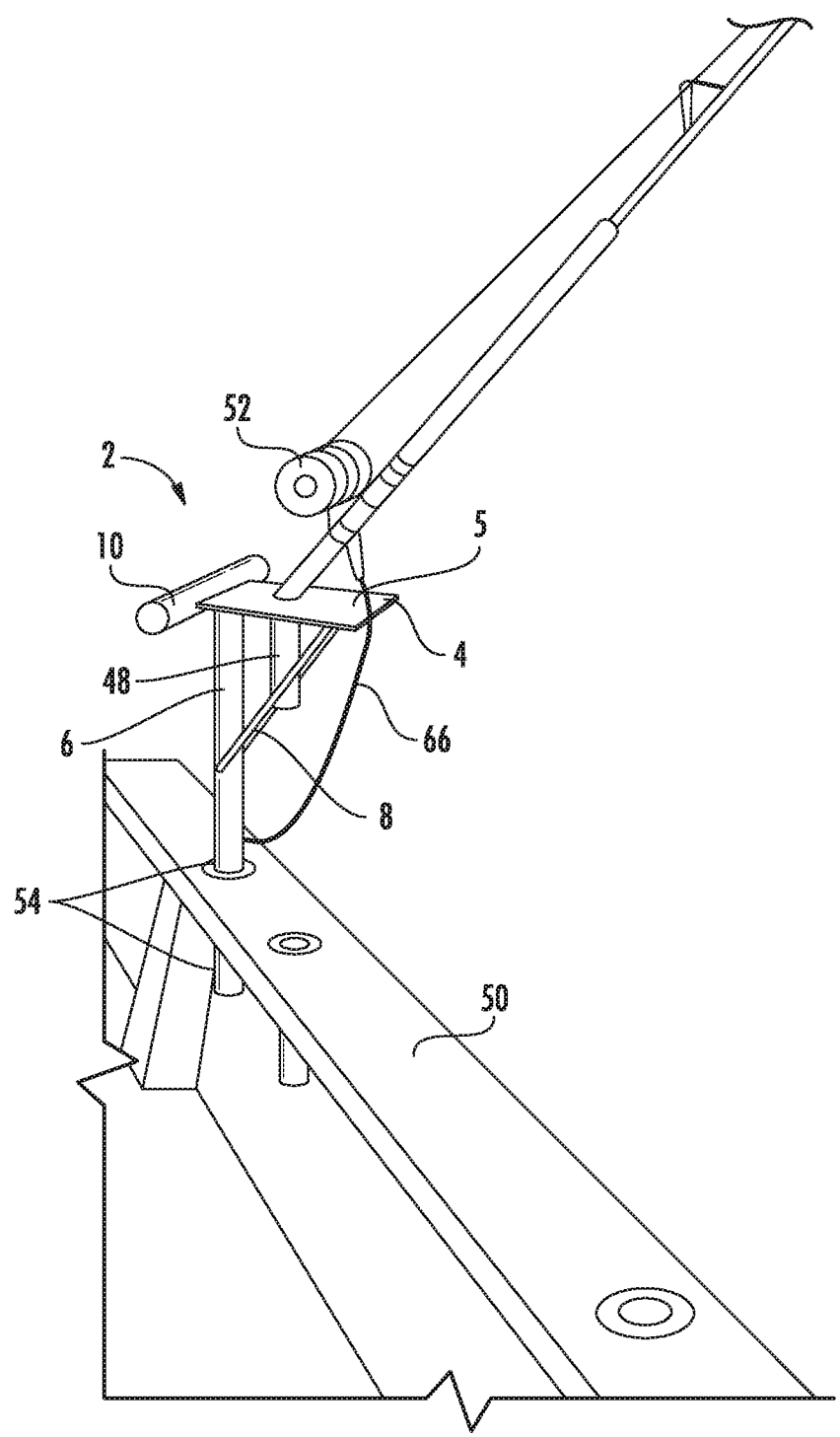
FIG. 6 is a perspective view of a system comprising a fishing rod stanchion, a fishing rod holder, and a fishing rod, in accordance with some embodiments described herein.
Figure 11:
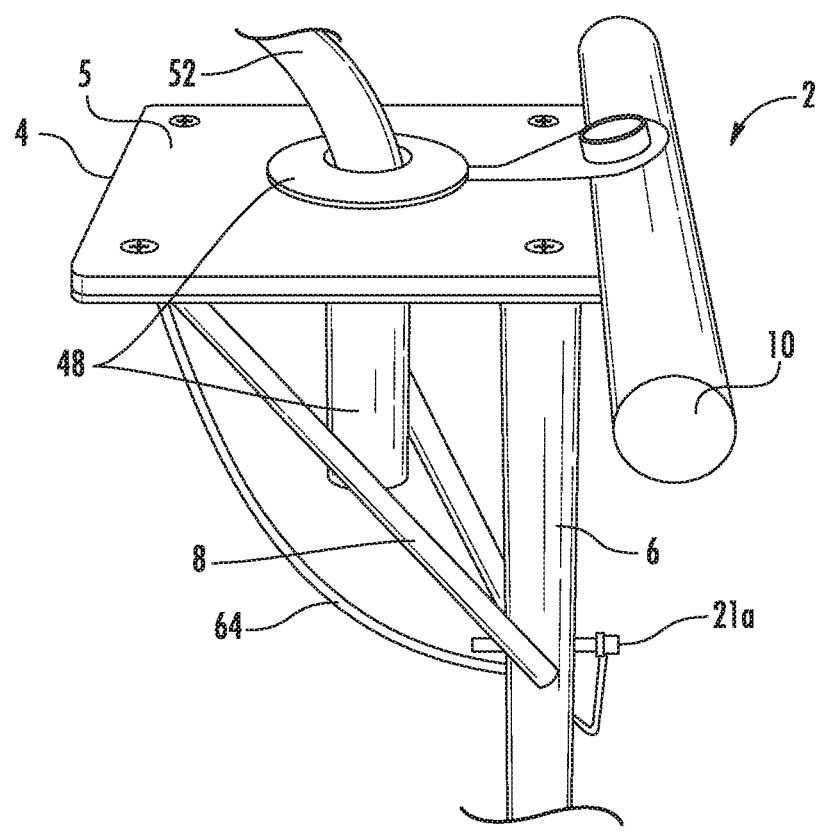
FIG. 11 is a perspective side view of a fishing rod stanchion, in accordance with some embodiments described herein.
Figure 12:
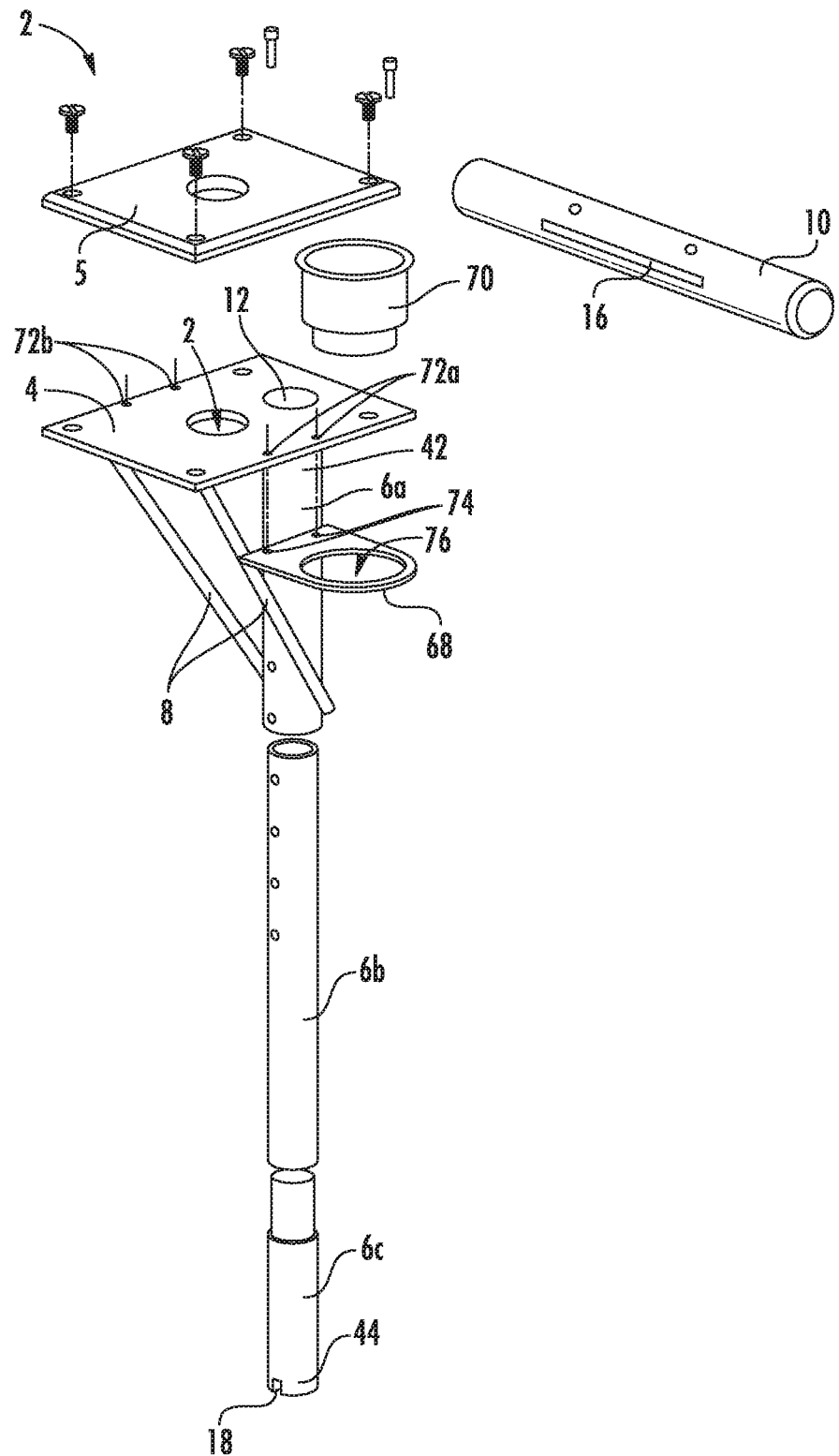
FIG. 12 is an exploded perspective view of a fishing rod stanchion, including a cup holder, in accordance with some embodiments described herein.
Figure 13:
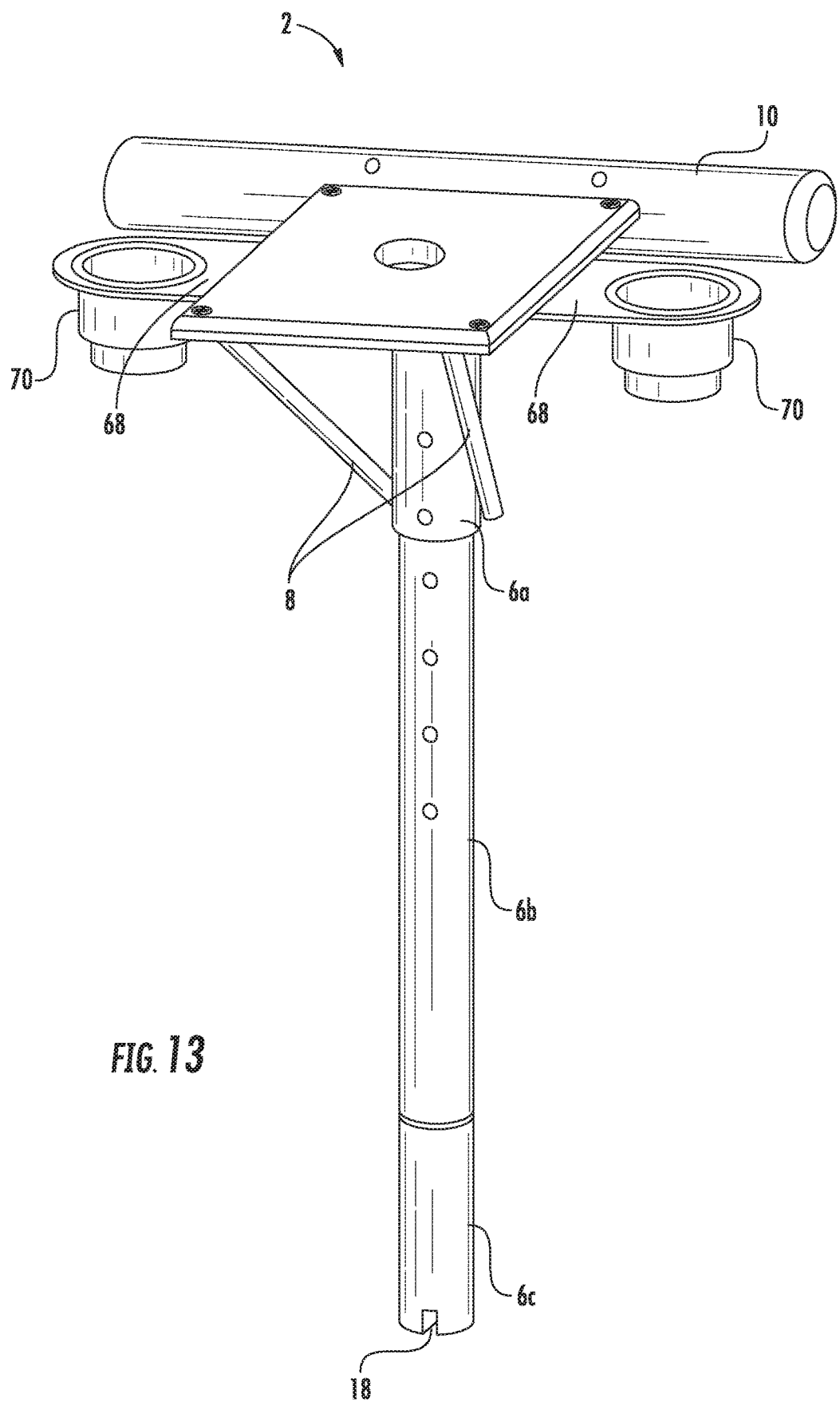
FIG. 13 is a front perspective view of a fishing rod stanchion, including a cup holder, in accordance with some embodiments described herein.

In some embodiments, the fishing rod stanchion 2 further comprises a fishing rod holder 48. As shown in FIGS. 6 and 11, for example, in some embodiments a fishing rod holder 48 can be mounted within an opening in the support plate 4. For example, a fishing rod holder 48 can be mounted in rod opening 14 of support plate 4 (see FIG. 3). In some embodiments, the fishing rod holder 48 is sized and configured in a circular shape having a diameter that is less than the diameter 34 for rod opening 14. In some embodiments, the fishing rod holder 48 is rotatable and configured to rotate within the rod opening 14. However, the fishing rod holder 48 is generally not rotatable within the rod opening 14 (e.g., it is non-rotatably secured to support plate 4). In some embodiments, as shown in FIGS. 6 and 11, the fishing rod holder 48 is a flush mount fishing rod holder.

Figure 9:
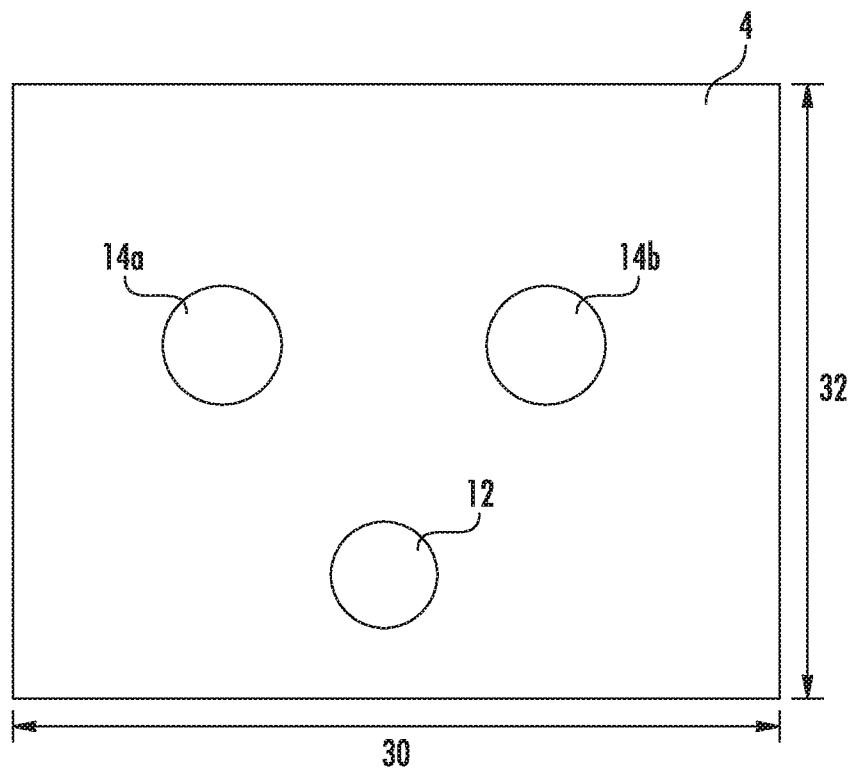
FIG. 9 is a top view of a fishing rod stanchion, in accordance with some embodiments described herein.

In some embodiments, the fishing rod stanchion 2 comprises a support plate 4 having a plurality of openings and further comprises a plurality of fishing rod holders. Although the support plate 4 in FIG. 3 comprises one rod opening 14, which can receive a fishing rod holder 48, it is contemplated that a larger support plate 4 (i.e., a wider support plate) can include a plurality of rod openings and fishing rod holders. As shown in FIG. 9, for example, the support plate 4 comprises stanchion opening 12 and rod openings 14a and 14b. In some embodiments, rod openings 14a and 14b can each receive a fishing rod holder 48.

In some embodiments, the fishing rod stanchion 2 includes an upright stanchion 6 extending down from the support plate 4. In some embodiments, the upright stanchion 6 comprises a top end 42, a bottom end 44, and a length 38. In some embodiments, the upright stanchion 6 can be any suitable length, such as, for example, a length in the range of about 6 inches to about 60 inches, or a length of at least 10 inches, at least 12 inches, at least 20 inches, or at least 40 inches, or any other suitable length. In some embodiments, the upright stanchion 6 can be any suitable width, such as, for example, a width in the range of about 0.5 inches to about 3 inches, or a width of at least ¾ inches, at least 1 inch, at least 1.25 inches, or at least 2 inches, or any other suitable width. Although specific lengths and widths are discussed herein, it will be appreciated that the upright stanchion 6 can include lengths and widths that are larger or smaller than the measurements disclosed herein.

In some embodiments, the distal, upper end 42 of the upright stanchion 6 can be permanently coupled to the support plate 4. In some embodiments, the upright stanchion 6 can be configured to be coupled to support plate 4 at stanchion opening 12. For example, if the upright stanchion 6 is welded to the support plate 4, the stanchion opening 12 can allow for a weld both between the upright stanchion 6 and the bottom surface of the support plate 4 and between the upright stanchion 6 and the edge of the stanchion opening 12. Although the upright stanchion 6 in FIGS. 1, 2, 6, 8, and 10-13 is circular, other shapes are contemplated. For example, the upright stanchion 6 can be in the shape of a rectangle (including square), triangle, trapezoid, or any other suitable shape. In some embodiments, for example, the upright stanchion 6 will be circular with a specified diameter. In some embodiments, for example, the upright stanchion 6 will be square and defined by the length of its sides.

In some embodiments, the upright stanchion 6 and support plate 4 are a single component. In some embodiments, the upright stanchion 6 and support plate 4 are a plurality of components that are joined together and, optionally, form an integral member. In some embodiments, the top end 42 of upright stanchion 6 is coupled to the support plate 4. In some embodiments, the top end 42 of upright stanchion 6 is coupled to stanchion opening 12 in support plate 4. For example, in some embodiments, the top end 42 of upright stanchion 6 can be permanently coupled (e.g., welded) to the stanchion opening 12 of support plate 4. It will be appreciated that the upright stanchion 6 includes shapes, sizes, and dimensions that are configured to the shapes, sizes, and dimensions of stanchion opening 12 in the support plate 4, if an opening for receiving the upright stanchion 6 is utilized to couple the upright stanchion 6 to the support plate 4.

In some embodiments, the upright stanchion 6 is one integral member. In some embodiments, the upright stanchion 6 comprises two or more members that are coupled together. In some embodiments, for example, the upright stanchion 6 comprises a plurality of members that are slidably and adjustably coupled for adjusting the length of the stanchion. In some embodiments, as shown in FIGS. 1, 2, 5, 10, 12, and 13, the upright stanchion 6 comprises a lower member, a middle member, and an upper member, wherein the lower member is rotatably coupled to the middle member and the middle member is slidably and adjustably coupled to the upper member for adjusting the length of the upright stanchion 6. In some embodiments, the upright stanchion 6 comprises a lower member, a middle member, and an upper member, wherein the lower member is slidably and adjustably coupled to the middle member for adjusting the length of the upright stanchion 6 and the middle member is rotatably coupled to the upper member. For example, in FIGS. 1, 2, 5, 10, 12, and 13, the upright stanchion 6 comprises an upper member 6a, a middle member 6b, and a lower member 6c. The lower member 6c is rotatably coupled to the middle member 6b, and the middle member 6b is slidably and adjustably coupled to the upper member 6a for adjusting the length of the upright stanchion 6. Although the embodiment depicted in FIGS. 1, 2, 5, 7, 10, and 12 illustrates a male-female connection between the lower member 6c and the middle member 6b such that lower member 6c is the male component with a beveled portion 9 and middle member 6b is the female component with a cavity for receiving the beveled portion, alternative configurations are also contemplated. In some embodiments, for example, the middle member 6b can contain a male component with a beveled portion and the lower member 6c can contain a female component with a cavity for receiving the beveled portion.

Figure 7:
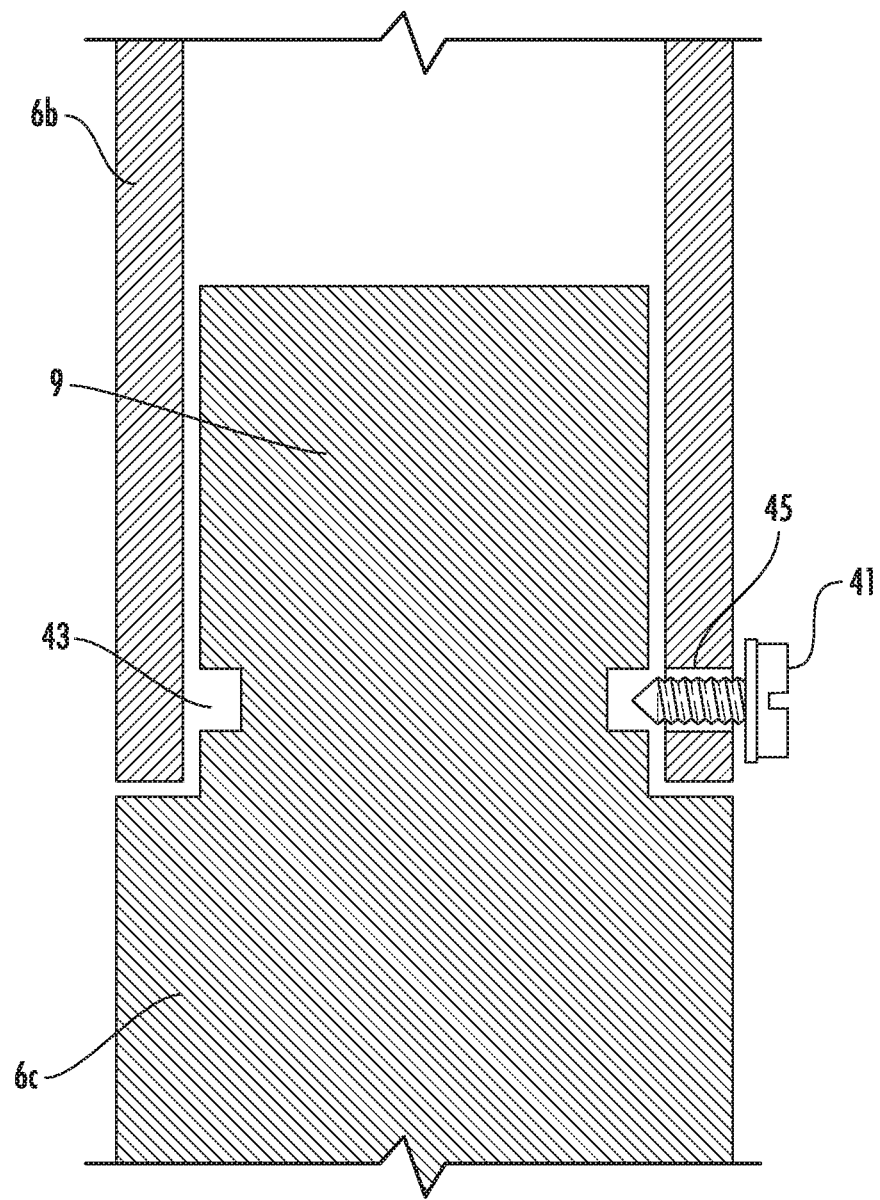
FIG. 7 is a cross-sectional view of FIG. 1 along cut-line 7-7.

In some embodiments, the members of upright stanchion 6 can be rotatably secured together. In some embodiments, for example, a set screw can be utilized to secure a rotatable coupling between two members of upright stanchion 6. For example, as shown in FIG. 7, a set screw 41 can be inserted into a threaded opening 45 and extend into a channel 43 of beveled portion 9 to removably secure lower member 6c and middle member 6b. When two members of upright stanchion 6 are securely coupled, the members can be rotatably coupled.

Figure 10:
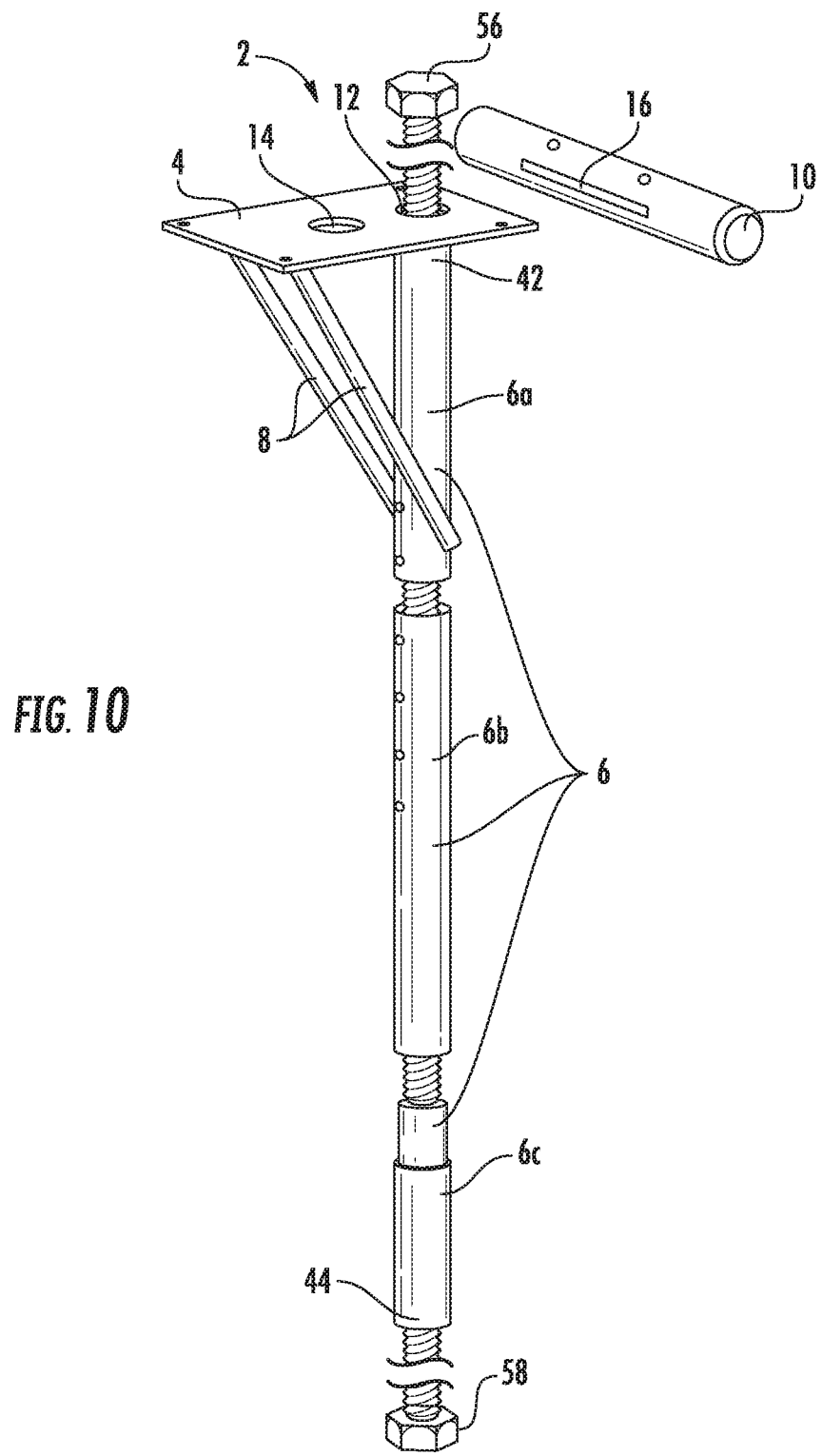
FIG. 10 is an exploded perspective view of a fishing rod stanchion, in accordance with some embodiments described herein.

In some embodiments, the fishing rod stanchion 2 further comprises a fastener 56 (e.g., a bolt) that passes through the support plate 4 and the top end 42 of the upright stanchion 6, and through upper member 6a, middle member 6b, and lower member 6c and the bottom end 44 of the upright stanchion 6, to a fastener counterpart 58 (e.g., a nut). Alternatively, the fastener 56 can pass through the upright stanchion 6 in the opposite direction, from the bottom end 44 to the top end 42, to a fastener counterpart 58 located above the support plate 4. For example, as shown in FIG. 10, the fastener 56 is a bolt that passes through the stanchion opening 12 in the support plate 4, through the upper member 6a, the middle member 6b, and the lower member 6c of upright stanchion 6, and through to the bottom end 44 of the upright stanchion 6, to where it can be received by a nut 58.

Figure 8:
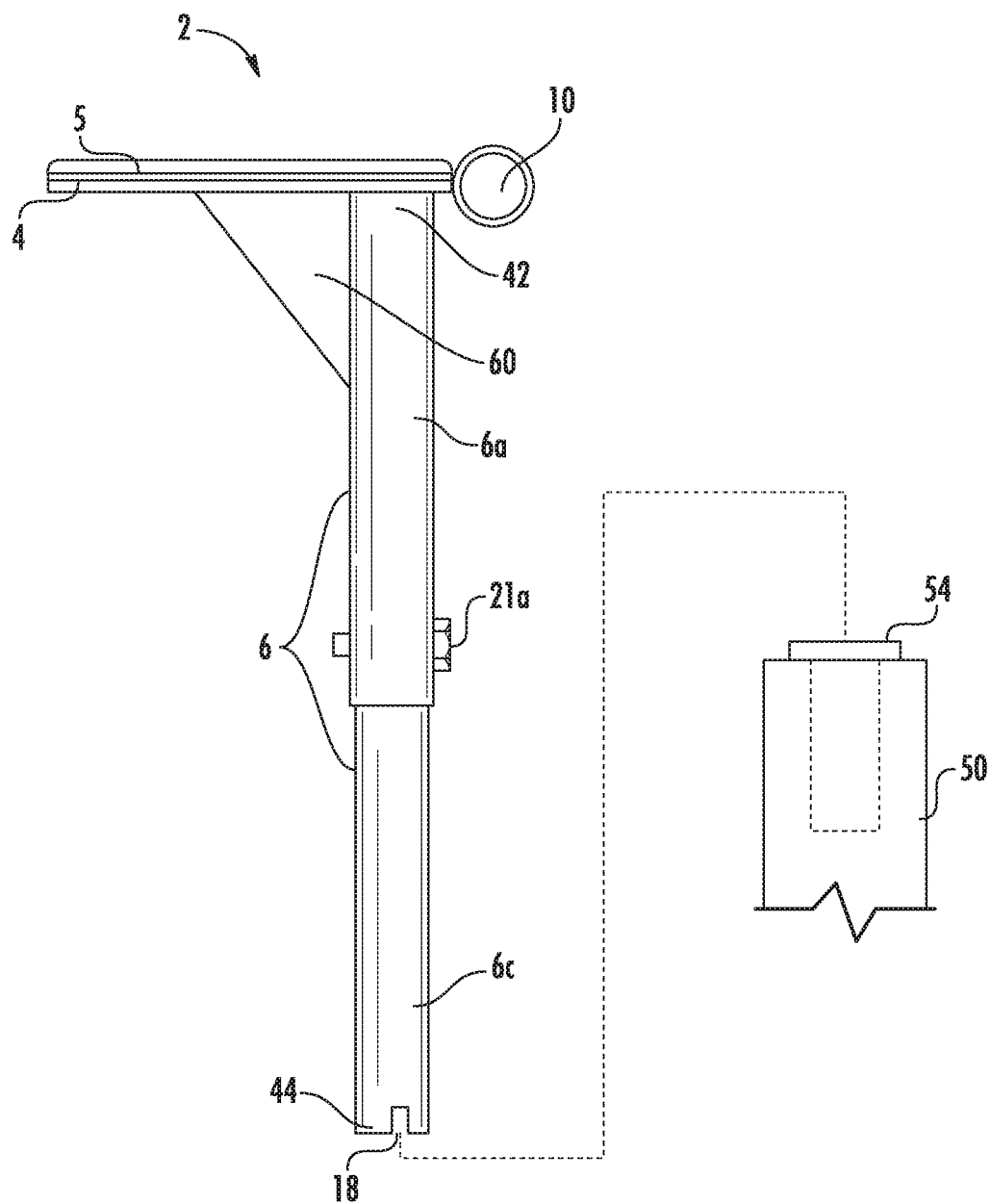
FIG. 8 is a side view of a fishing rod stanchion, in accordance with some embodiments described herein.

In some embodiments, the upright stanchion 6 can comprise an outer, tubular member and an inner, member. As shown in FIG. 8, for example, the outer, tubular member is the upper member 6a, which is coupled to the support plate 4, and the inner, rotatable member can be the lower member 6c, which is coupled to the fishing rod holder 54. In such an embodiment, pin 21a is not present and the length of the lower, rotatable member 6c is configured to extend from the bottom end 44 to the top end 42 of the upright stanchion 6. In some embodiments, the handle 10, the support plate 4, and the outer, tubular member 6a (i.e., the upper member 6a) are rotatable, and the inner member 6c (i.e., the lower member 6c) and fishing rod holder 54 are non-rotatable. In some embodiments, the handle 10, the support plate 4, and the outer, tubular member 6a (i.e., the upper member 6a) are non-rotatable, and the inner member 6c (i.e., the lower member 6c) and fishing rod holder 54 are rotatable.

In some embodiments, the upright stanchion 6 comprises two or more members that are slidably and adjustably coupled for adjusting the upright stanchion 6. In some embodiments, the length of the upright stanchion 6 is adjustable via a mechanism selected from the group consisting of a rack and pinion mechanism, a cable and pulley mechanism, a ratchet mechanism, a ball screw mechanism, a removable pin and holes arrangement, a spring-loaded push button mechanism, and a hydraulic mechanism. For example, in FIGS. 1, 5, 6, 8, 10, 12, and 13, the upright stanchion 6 is adjustable via a removable pin and holes arrangement comprising pin 21a, holes 20a in middle member 6b, and holes 20b in upper member 6a. The length of the upright stanchion 6 is adjustable because an outer member is adapted to receive an inner member therein. For example, as evident from FIGS. 1, 2, 12, and 13, a portion of the middle member 6b fits inside tubular (e.g., hollow) upper member 6a so that they are slidably coupled.

In some embodiments, the bottom end 44 of the upright stanchion 6 is configured to be removably coupled to a fishing rod holder. In some embodiments, the bottom end 44 of the upright stanchion 6 comprises a slot 18, wherein the slot 18 is configured to receive a component of the fishing rod holder 54 (e.g., a projection or rib). For example, in FIGS. 2, 5A, 8, 12, and 13, the bottom end 44 of the lower member 6c includes a slot 18 that is configured to receive a component of a fishing rod holder. Although the bottom end 44 of the upright stanchion 6 is configured with the slot 18, it would be appreciated that other configurations are contemplated.

In some embodiments, the fishing rod stanchion 2 comprises a mechanism for securing a rotatable upright stanchion 6 to a fixed location. As shown in FIG. 6, for example, in some embodiments the fishing rod stanchion 2 is mounted to the gunwale 50 of a vessel and a fishing rod 52 is secured by the fishing rod stanchion 2. In some embodiments, the upright stanchion 6 is mounted to a fishing rod holder 54 that is mounted to the gunwale 50 of a vessel. In some embodiments, the upright stanchion 6 can rotate at least 180 degrees (e.g., from the bow of a vessel to the stern of the vessel or vice versa), at least 170 degrees, or 360 degrees. The fishing rod stanchion 2 can further comprise a locking mechanism (e.g., a pin and hole arrangement) that prevents the upright stanchion 6 from rotating.

In some embodiments, the fishing rod stanchion 2 further comprises one or more reinforcing members 8. For example, in FIGS. 1, 2, 6, and 10-13, the fishing rod stanchion 2 comprises reinforcing members 8. In some embodiments, for example, the one or more reinforcing members 8 extend from the distal portion 24 of the support plate 4 to the upright stanchion 6. In some embodiments, for example, the one or more reinforcing members 8 extend from the middle third or proximal third of the support plate 4 to the upright stanchion 6. In some embodiments, the upright stanchion 6 comprises a plurality of members, including an upper member 6a, and the one or more reinforcing members 8 are permanently coupled between the upper member 6a of the upright stanchion 6 and the support plate 4. In some embodiments, the fishing rod stanchion 2 comprises one or more gusset plates 60. In some embodiments, the one or more gusset plates 60 can extend from the proximal third 28, the middle third 26, or the distal third 24 of the support plate 4 to the upright stanchion 6. It would be appreciated that the span between multiple reinforcing members 8 or multiple gusset plates 60 can vary with respect to where they are coupled to the support plate 4. Although reinforcing members 8 are depicted as bars in FIGS. 1, 2, 6, and 10-13, and as a gusset plate 60 in FIG. 8, it would be appreciated that other reinforcing supports are contemplated. For example, the one or more reinforcing members 8 can comprise a corner brace, corner bracket, angle bracket, or any other suitable coupling support.

Figure 3:
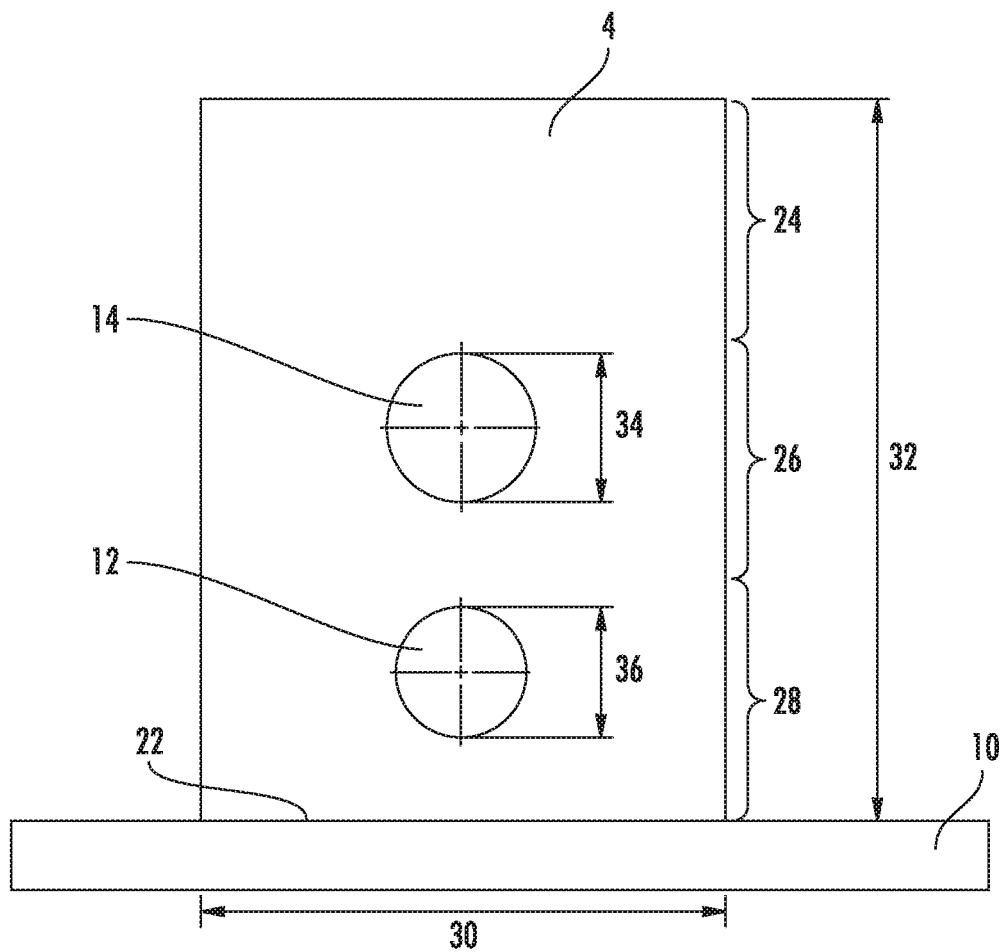
FIG. 3 is a top view of a fishing rod stanchion, in accordance with some embodiments described herein.
Figure 4:
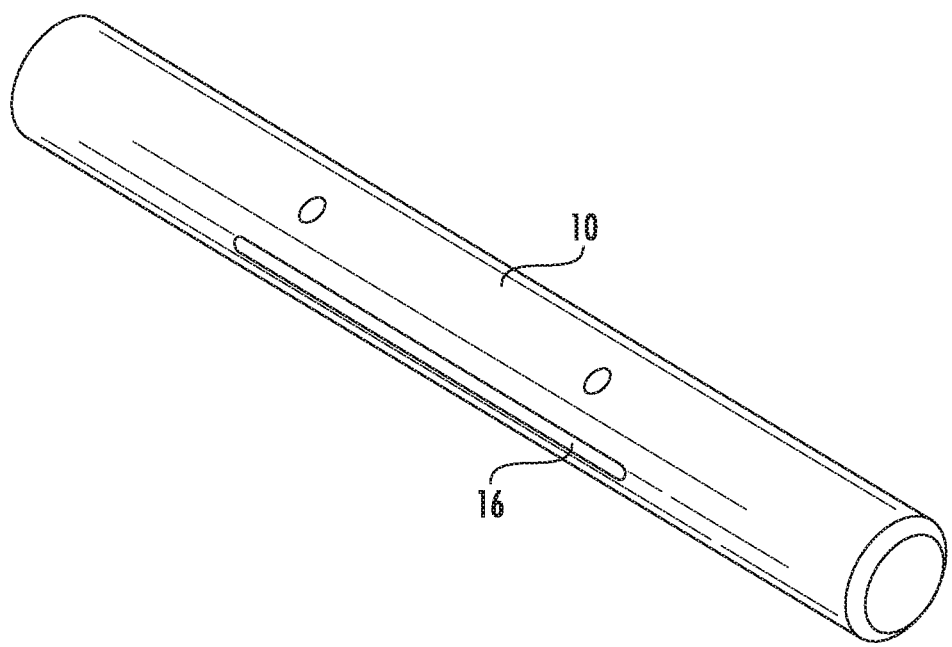
FIG. 4 is a perspective view of a handle for a fishing rod stanchion, in accordance with some embodiments described herein.
Figure 5A:
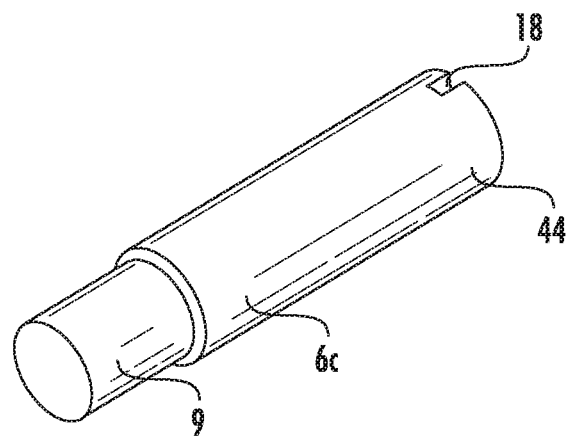
FIG. 5A is a perspective view of a lower member of an upright stanchion, in accordance with some embodiments described herein.
Figure 5B:
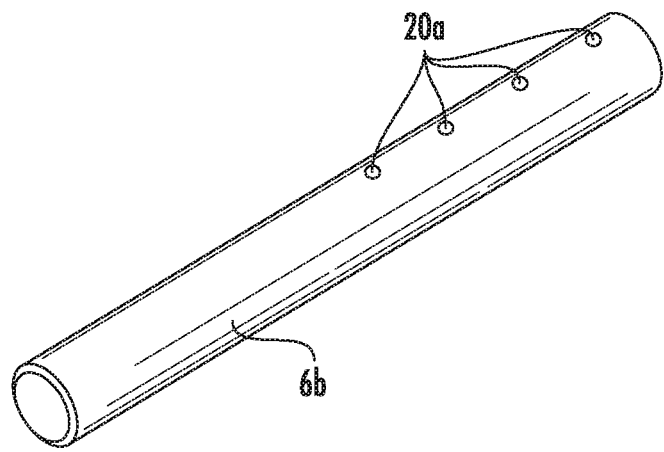
FIG. 5B is a perspective view of a middle member of an upright stanchion, in accordance with some embodiments described herein.
Figure 5C:
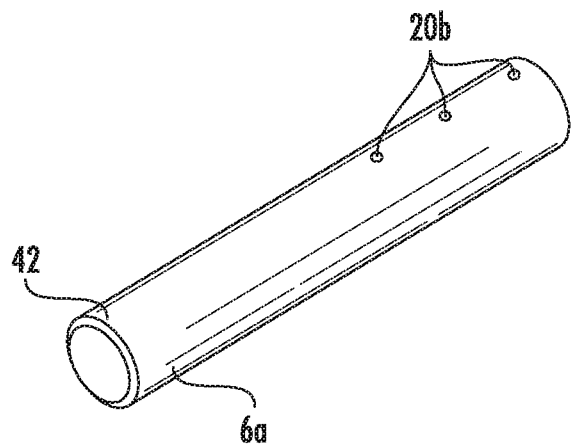
FIG. 5C is a perspective view of an upper member of an upright stanchion, in accordance with some embodiments described herein.

In some embodiments, the fishing rod stanchion 2 includes a handle 10. The handle 10 can be used to control the fishing rod stanchion 2 and therefore, control a fishing rod held by the fishing rod stanchion 2. The handle 10 can include any suitable dimensions sized and configured to be gripped by a hand, and any suitable dimensions sized and configured to be fastened to the support plate 4. In some embodiments, as shown in FIG. 3, the handle 10 extends laterally beyond an end of a proximal edge 22 of the support plate 4. In some embodiments, the handle 10 extends laterally beyond both ends of a proximal edge 22 of the support plate 4. For example, in FIGS. 1, 3, 6, and 10-13, the handle 10 is sized and configured to extend laterally beyond both ends of proximal edge 22 of the support plate 4. In some embodiments, the handle 10 can extend any suitable distance beyond the end of the proximal edge 22, such as, for example, a distance in the range of about 1 to about 36 inches, or about 1 to 6 inches, or a distance of at least 1 inch, at least 3 inches, at least 5 inches, or any other suitable distance. In some embodiments, the handle 10 can include any suitable width, such as, for example, a width in the range of about 0.5 inches to about 3 inches, or about 1 inch to 2 inches, or a width of at least ½ inch, at least ¾ inch, at least 1 inch, or at least 1.25 inches, or any other suitable width. Although specific lengths and widths are discussed herein, it will be appreciated that the handle 10 can include lengths and widths that are larger or smaller than the measurements disclosed herein.

In some embodiments, the handle 10 is an element coupled to the support plate 4. In such embodiments, the handle 10 can include a slot 16. For example, in FIGS. 1, 4, 10, and 12, the handle 10 includes the slot 16. In some embodiments, the slot 16 is sized and configured to receive the distal edge 22 of support plate 4. For example, in FIGS. 2-4, the slot 16 is sized and configured to receive the proximal edge 22 of the support plate 4. In some embodiments, the handle 10 is cylindrical. Although the handle 10 is depicted with a cylindrical shape in FIGS. 1, 2, 4, 6, 8, and 10-13, it would be appreciated that other shapes are contemplated. For example, the handle 10 can be shaped as an oval, square, triangle, or any suitable and/or ergonomic shape. Further, the handle 10 can be shaped with ergonomic features. In some embodiments, for example, the handle 10 can be shaped and configured to be gripped by a human hand whereby fingers of the hand are bunched firmly around the handle 10 and overlap with the thumb of the hand. In some embodiments, an ergonomic handle can be shaped and configured to be gripped by a human hand whereby fingers of the hand are bunched firmly around the handle 10 and the thumb of the hand is allowed to go straight along the back of the handle 10. In some embodiments, the handle 10 comprises a grip that is either ergonomic or not.

The fishing rod stanchion 2 and the components thereof can be prepared from any suitable material, such as, but not limited to, a metal, a metal alloy, a plastic, or a ceramic. In some embodiments, one or more of the support plate 4, the upright stanchion 6, the one or more reinforcing members 8, and the handle 10 are a metal alloy (e.g., steel). It would be appreciated that any suitable metals and metal alloys are contemplated. It would be further appreciated that the materials used for the fishing rod stanchion 2 are resistant to weathering conditions and the conditions that the fishing rod stanchion 2 would be subjected to on an ocean, river, lake, etc. It would be appreciated, that the material can be coated with a coating or film that prevents or reduces the risk of weathering (e.g., rust, corrosion). In some embodiments, one or more of the support plate 4, the upright stanchion 6, the one or more reinforcing members 8, and the handle 10 are made of, covered by, or coated with a plastic, a polymer, or any other suitable material (e.g., a marine grade UV-stabilized high-density polyethylene, or other acceptable materials that are commonly used in the marine industry, such as, e.g., low-density polyethylene, ultra-high molecular weight polyethylene, polypropylene, polystyrene, polyamide, chlorinated polyethylene, polyvinyl chloride, chlorosulfonated polyethylene, etc.). These materials can be UV stabilized and, where necessary, corrosion resistant. In some embodiments, the handle 10 further comprises a grip that can fit over the handle 10, and the grip is comprised of a material that is the same or different as the handle. In some embodiments, such as in FIGS. 6 and 11, an upper surface of the metal support plate 4 is covered with a plastic plate 5 that includes a rod opening matching the rod opening 14 in the support plate 4.

Figure 2:
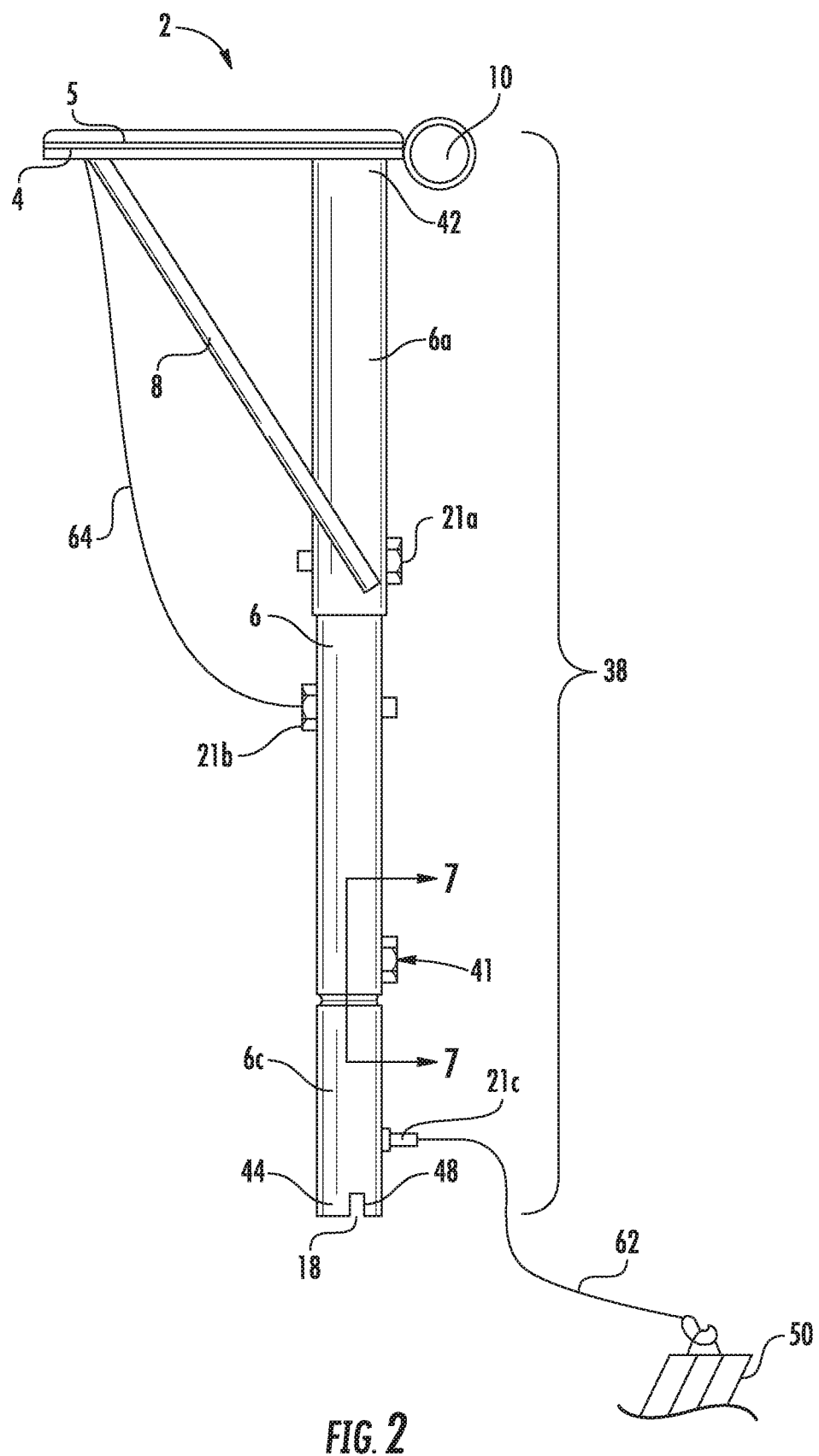
FIG. 2 is a side view of a fishing rod stanchion, in accordance with some embodiments described herein.

In some embodiments, the fishing rod stanchion 2 further comprises one or more security restraints. In some embodiments, a security restraint can secure the fishing rod stanchion 2 to a vessel. For example, in FIG. 2, a security cable 62 connects and secures pin 21c in lower member 6c of the upright stanchion 6 to gunwale 50. In some embodiments, a security restraint can secure one component of the fishing rod stanchion 2 to another component. For example, as shown in FIGS. 2 and 11, security cable 64 connects and secures the support plate 4 to the upright stanchion 6 of the fishing rod stanchion 2 via pin 21a and pin 21b, respectively. In some embodiments, a security restraint can secure a fishing rod to the fishing rod stanchion 2 or to the gunwale 50. For example, in FIG. 6, security cable 66 connects and secures fishing rod 52 to the fishing rod stanchion 2. In some embodiments, a security restraint can secure a component used to adjust the length of the upright stanchion 6. For example, as shown in FIG. 11, security chain 64 connects and secures pin 21a to the fishing rod stanchion 2. Although security cables 62 and 64 are used in FIGS. 2 and 11, and security chain 66 is used in FIG. 6. It should be appreciated that a chain, a cable, or other security restraints are contemplated.

In some embodiments, the fishing rod stanchion 2 further comprises one or more drink holders for receiving, e.g., cups, cans, bottles, fishing rod accessories, sunglasses etc. For example, in FIG. 12, a coupling support 68 secures cup holder 70 to the support plate 4. In some embodiments, the coupling support 68 and cup holder 70 are separable, while they are integrally formed as a single piece in other embodiments. Other shapes are contemplated. In some embodiments, the coupling ring 68 is fastened to the support plate 4 via fasteners (e.g., screws, bolts and nuts, etc.) passing through holes 74 and support plate holes 72a or 72b. The cup holder 70 can be inserted into hole 76 of the coupling support 68. In some embodiments, multiple drink holders can be fastened to the support plate 4. For example, in FIG. 13, one drink holder is connected to each opposing edge of support plate 4.

A system comprising the fishing rod stanchion 2 as disclosed and described herein, a fishing rod holder, and a fishing rod is also disclosed. The system optionally further comprise one or more security cables 64. In some embodiments, the system is used on a vessel. In some embodiments, a gunwale or stern of the vessel can comprise an opening that can receive a fishing rod holder 54. In some embodiments, the fishing rod holder 54 is rotatable with respect to the gunwale or stern, as shown in FIG. 8. In such embodiments, the fishing rod stanchion 2 does not need to include a rotatable upright stanchion 6. In such embodiments, the non-rotatable upright stanchion 6 is mounted in a rotatable fishing rod holder 54, which is mounted to gunwale 50. In some embodiments, the fishing rod holder 54 is non-rotatable with respect to the gunwale 50 or the stern (not pictured). In such embodiments, the fishing rod stanchion 2 can comprise a rotatable upright stanchion 6 that may include one or more rotatable members (e.g., lower member 6c, middle member 6b, or upper member 6a), as shown in FIGS. 1, 5, 6, 10, and 12.

In some embodiments, the fishing rod holder 54 is a standard size fishing rod holder. In some embodiments, the fishing rod stanchion 2 comprising the upright stanchion 6 can be sized and configured so that upright stanchion 6 can be received by an opening in a gunwale or the stern of a vessel or in a fishing rod holder 54, including a standard-sized fishing rod holder, that is secured within the opening in the gunwale or stern. As shown in FIG. 6, for example, fishing rod stanchion 2 is received in fishing rod holder 54, securing it to gunwale 50. The fishing rod stanchion 2 comprises a support plate 4, and the support plate 4 comprises one or more rod openings 14 that can receive one or more fishing rod holders 48. The one or more fishing rod holders 48 in the support plate 4 can be the same or different from one another and the same or different from the fishing rod holder 54 received by the opening in the gunwale 50. The fishing rod holder 48 is configured to receive fishing rod 52.

The fishing rod stanchion 2 can be mounted to the gunwale 50 of a vessel. The fishing rod stanchion 2 can be utilized to hold and/or secure one or more fishing rods 52 to the gunwale 50. When used in conjunction with a bent butt rod (e.g., a 30 series tuna rod), the fishing rod stanchion 2 maintains the rod at an ideal angle for trolling bait or reeling in a fish. When one or more fishing rods are held in the fishing rod stanchion 2, a person can utilize the handle 10 of the fishing rod stanchion 2 to steer the fishing rod 52 during trolling. In some embodiments, the fishing rod stanchion 2 comprises an upright stanchion 6 having one or more rotatable members. In some embodiments, a person can rotate the fishing rod stanchion 2 thereby causing the one or more fishing rods 52 held by the fishing rod stanchion 2 to be rotated. For example, as shown in FIG. 6, the fishing rod stanchion 2 is mounted to gunwale 50 and holds fishing rod 52. The fishing rod stanchion 2 comprises the upright stanchion 6 having one or more rotatable members such that a user can steer the fishing rod stanchion 2 and fishing rod 52 using handle 10. When used in conjunction with a bent butt rod (e.g., a 30 series tuna rod), the fishing rod stanchion 2 maintains the rod at an ideal angle for trolling bait or reeling in a fish.

The fishing rod stanchion 2 can be used by persons having average size and strength or by persons having more or less than average size and strength. For example, a child having a size and strength that is less than the average size and strength for an adult can utilize the fishing rod stanchion 2 to steer a fishing rod 52 using the handle 10 when a fish is hooked on the line of the fishing rod 52. In addition, the fishing rod stanchion 2 secures the rod 52 so all the user needs to do is reel in the fish, without needing to control the rod 52 to fight the fish. If a fish is hooked by a fishing rod 52 while the fishing rod 52 is pointed off the side of the vessel and directed towards the stern of the vessel, then the line can be reeled in while the rod is secured to the fishing rod stanchion 2. When the fish is close to the vessel and the distance between the vessel and the fish are relatively short, then the fishing rod stanchion 2 can be rotated within fishing rod holder 54 to a different position. For example, the fishing rod can be rotated from the stern of the vessel to the bow of the vessel. Upon such a rotation, the fishing rod reel can be locked, the fishing rod stanchion 2 can be locked in place, and the user can then utilize another tool to land the fish (e.g., a net or harpoon). Alternatively, the fishing rod stanchion 2 can be rotated towards a position on the vessel where another person is able to assist in landing the fish.

The foregoing is provided for purposes of illustrating, explaining, and describing embodiments of this invention. Modifications and adaptations to these embodiments will be apparent to those skilled in the art and may be made without departing from the scope or spirit of this invention.

Although the subject matter has been described in terms of exemplary embodiments, it is not limited thereto. Rather, the appended claims should be construed broadly, to include other variants and embodiments, which may be made by those skilled in the art.

What is claimed is:

1. A fishing rod stanchion configured to receive and hold a fishing rod in an upright position, comprising:
    a support plate comprising a proximal portion, a distal portion, and one or more openings passing through the support plate;
    an upright stanchion comprising a top end and a bottom end, wherein the top end is coupled to the proximal portion of the support plate; and
    a handle extending laterally beyond an end of a proximal edge of the support plate.

2. The fishing rod stanchion of claim 1, wherein the handle extends laterally beyond both edges of a proximal edge of the support plate.

3. The fishing rod stanchion of claim 1, further comprising one or more reinforcing members, wherein the one or more reinforcing members extend from the distal portion of the support plate to the upright stanchion.

4. The fishing rod stanchion of claim 1, wherein the upright stanchion is a one integral member.

5. The fishing rod stanchion of claim 1, wherein the upright stanchion comprises two or more members that are slidably and adjustably coupled for adjusting a length of the stanchion.

6. The fishing rod stanchion of claim 5, wherein the upright stanchion comprises two members that are rotatably coupled.

7. The fishing rod stanchion of claim 5, wherein the upright stanchion comprises a lower member, a middle member, and an upper member, wherein (i) the lower member is rotatably coupled to the middle member and the middle member is slidably and adjustably coupled to the upper member for adjusting the length of the stanchion, or (ii) the lower member is slidably and adjustably coupled to the middle member for adjusting the length of the stanchion and the middle member is rotatably coupled to the upper member.

8. The fishing rod stanchion of claim 5, wherein the length of the upright stanchion is adjustable via a mechanism selected from the group consisting of a rack and pinion mechanism, a cable and pulley mechanism, a ratchet mechanism, a ball screw mechanism, a removable pin and holes arrangement, a spring-loaded push button mechanism, and a hydraulic mechanism.

9. The fishing rod stanchion of claim 1, further comprising a fishing rod holder mounted within one of the one or more openings passing through the support plate.

10. The fishing rod stanchion of claim 9, wherein the fishing rod holder is a flush mount fishing rod holder.

11. The fishing rod stanchion of claim 1, wherein the bottom end of the upright stanchion is configured to be removably coupled to a fishing rod holder.

12. The fishing rod stanchion of claim 11, wherein the bottom end of the upright stanchion comprises a slot, wherein the slot is configured to receive a component of the fishing rod holder.

13. The fishing rod stanchion of claim 7, further comprising one or more reinforcing members, wherein the one or more reinforcing members extend from the distal portion of the support plate to the upper member of the upright stanchion.

14. The fishing rod stanchion of claim 1, wherein the handle comprises a slot; and wherein the slot is configured to receive the support plate.

15. A system comprising:
   a fishing rod stanchion configured to receive and hold a fishing rod in an upright position, the fishing rod stanchion comprising:
      a support plate comprising a proximal portion, a distal portion, and one or more openings passing through the support plate;
      an upright stanchion comprising a top end and a bottom end, wherein the top end is coupled to the proximal portion of the support plate; and
      a handle extending laterally beyond an end of a proximal edge of the support plate;
   a fishing rod holder; and
   a fishing rod.

16. The system of claim 15, wherein the handle extends laterally beyond both edges of a proximal edge of the support plate.

17. The system of claim 15, wherein the fishing rod stanchion further comprising one or more reinforcing members, wherein the one or more reinforcing members extend from the distal portion of the support plate to the upright stanchion.

18. The system of claim 15, wherein the upright stanchion comprises two or more members that are slidably and adjustably coupled for adjusting a length of the stanchion.

19. The system of claim 18, wherein the upright stanchion comprises a lower member, a middle member, and an upper member, wherein (i) the lower member is rotatably coupled to the middle member and the middle member is slidably and adjustably coupled to the upper member for adjusting the length of the stanchion, or (ii) the lower member is slidably and adjustably coupled to the middle member for adjusting the length of the stanchion and the middle member is rotatably coupled to the upper member.

20. The system of claim 18, wherein the length of the upright stanchion is adjustable via a mechanism selected from the group consisting of a rack and pinion mechanism, a cable and pulley mechanism, a ratchet mechanism, a ball screw mechanism, a removable pin and holes arrangement, a spring-loaded push button mechanism, and a hydraulic mechanism.

* * * * *